US007469216B2

(12) United States Patent
Kumhyr et al.

(10) Patent No.: US 7,469,216 B2
(45) Date of Patent: Dec. 23, 2008

(54) METHOD AND SYSTEM FOR MANIPULATION OF COST INFORMATION IN A DISTRIBUTED VIRTUAL ENTERPRISE

(75) Inventors: David B. Kumhyr, Austin, TX (US); Margaret G. MacPhail, Corpus Christi, TX (US); Sebastian D. Hassinger, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 725 days.

(21) Appl. No.: 10/112,538

(22) Filed: Mar. 28, 2002

(65) Prior Publication Data

US 2003/0187748 A1  Oct. 2, 2003

(51) Int. Cl.
*G06Q 30/00* (2006.01)
*G06Q 10/00* (2006.01)

(52) U.S. Cl. .................. 705/26; 705/1; 705/8; 705/10; 707/102

(58) Field of Classification Search .................. 705/26, 705/27, 1, 8, 10; 707/102
See application file for complete search history.

(56) References Cited

U.S. PATENT DOCUMENTS

| | | | | |
|---|---|---|---|---|
| 4,799,156 | A | 1/1989 | Shavit et al. ................ 705/26 |
| 5,019,961 | A | 5/1991 | Addesso et al. | |
| 5,191,534 | A | 3/1993 | Orr et al. .................... 700/105 |
| 5,748,188 | A | 5/1998 | Hu et al. ..................... 715/853 |
| 5,950,173 | A | 9/1999 | Perkowski ................... 705/26 |
| 5,953,236 | A | 9/1999 | Hossain et al. ................ 716/6 |
| 6,078,907 | A | 6/2000 | Lamm ......................... 705/40 |
| 6,115,690 | A | 9/2000 | Wong ........................... 705/7 |
| 6,141,653 | A | 10/2000 | Conklin et al. ............... 705/80 |
| 6,148,290 | A | 11/2000 | Dan et al. ..................... 705/1 |
| 6,167,383 | A * | 12/2000 | Henson ........................ 705/26 |
| 6,286,028 | B1 | 9/2001 | Cohen et al. ................ 709/202 |
| 6,539,386 | B1 | 3/2003 | Athavale et al. .............. 707/10 |
| 6,621,505 | B1 | 9/2003 | Beauchamp et al. ......... 715/764 |
| 6,766,361 | B1 | 7/2004 | Venigalla .................... 709/217 |
| 6,868,387 | B1 | 3/2005 | Krueger et al. ................ 705/7 |

(Continued)

FOREIGN PATENT DOCUMENTS

WO  WO 01/33369 A1  5/2001

OTHER PUBLICATIONS

*Business Process and Business Information Analysis Overview v1.0*, ebxml.org—UN/CEFACT and OASIS, pp. 1-40, May 2001.

(Continued)

*Primary Examiner*—Yogesh C Gary
(74) *Attorney, Agent, or Firm*—Hamilton & Terrile, LLP; Stephen A. Terrile

(57) ABSTRACT

A method, system, apparatus, and computer program product for processing e-commerce information are presented. A business entity may transfer e-commerce agreements through an electronic marketplace. The business entity retrieves dependency information about a commercial transaction from an e-commerce agreement. The business entity incorporates the dependency information, e.g., dates, costs, deliveries, etc., as dependency relationships within a project model that represents a project for a product or service for sale by the first business entity. User input is received for manipulating a cost dependency relationship within the project model while constraining the user input to ensure that another type of dependency relationship is not incompatible with modifications to the cost dependency relationship.

2 Claims, 7 Drawing Sheets

U.S. PATENT DOCUMENTS

| | | | | |
|---|---|---|---|---|
| 7,069,234 | B1 | 6/2006 | Cornelius et al. | 705/26 |
| 7,069,235 | B1* | 6/2006 | Postelnik et al. | 705/26 |
| 7,089,193 | B2 | 8/2006 | Newbold | 705/9 |
| 7,096,189 | B1 | 8/2006 | Srinivasan | 705/11 |
| 7,139,719 | B1 | 11/2006 | Cherneff | 705/8 |
| 2002/0083079 | A1 | 6/2002 | Meier et al. | 707/104.1 |
| 2002/0087337 | A1 | 7/2002 | Hensley | 705/1 |
| 2002/0087446 | A1 | 7/2002 | Reddy | 705/36 R |
| 2002/0091614 | A1 | 7/2002 | Yehia | 705/37 |
| 2002/0128946 | A1 | 9/2002 | Chehade | 705/37 |
| 2002/0169658 | A1 | 11/2002 | Adler | |
| 2002/0178021 | A1* | 11/2002 | Melchior et al. | 705/1 |
| 2003/0014423 | A1* | 1/2003 | Chuah et al. | 707/102 |
| 2003/0074245 | A1 | 4/2003 | Salle | 705/7 |
| 2003/0101089 | A1 | 5/2003 | Chappel | 705/10 |

OTHER PUBLICATIONS

*ebXML Technical Architecture Specification v.1.0.4*, ebxml.org—UN/CEFACT and OASIS, pp. 1-39, Feb. 2001.

A Guide To The Project Management Body of Knowledge, Project Management Institute, 1996, ISBN 1-880410-13-3.

Angelov, S. et al., An Approach to the Construction of Flexible 828 E-Contracting Processes, CTIT Technical Report 02-40; University of Twente, 2002.

Bartusch, M. et al., Scheduling Project Networks with Resource Constraints and Time Windows Annals of Operations Research, vol. 16, 1988; pp. 201-240.

Business to Business Integration With Trading Partner Agreements, International Business Machines, 2000.

Cole, James et al., Extending Support for Contracts in ebXML, Information Technology for Virtual Enterprises, 2001.

Gillett, Frank E., The XML e8usiness Contract, The Forrester Report, Sep. 2000.

Goodchild, A. et al., Business contracts for B28, CAISE, 2000.

Hoffner Y., Field S., Grefen P., Ludwig, H., Contract-drived creation and operation of virtual enterprises, Computer Networks, vol. 37, 2001, pp. 111-136.

Joeris, Gregor et al., Flow.Net: Workflow Support for Inter-Organizational Engineering and Production Processes, International Journal of Agile Manufacturing, 2000.

Klingemann, Jusuts, Flexible Change Control—CrossFlow, CrossFlow Consortium, Jan. 20, 2000.

Ludwig, H., Hoffner, Y.: Contract-based Cross-Organizational Workflows—The CrossFlow Project, WACC'99: Workshop on Cross-Organizational Workflow Management and Co-ordination. San Francisco, CA 1999.

M. Koetsier, P. Grefen, J. Vonk; Contracts for Cross-Organizational Workflow Management Proceedings 1st International Conference on Electronic Commerce and Web Technologies; London, UK, 2000.

Marjanovic, Olivera et al., Towards Formal Modeling of e-Contracts 5th International Enterprise Distribute Object Conference, 2001.

P. Grefen, K. Aberer, Y. Hoffner, H. Ludwig, CrossFlow: Cross-Organizational Workflow Management in Dynamic Virtual Enterprises, International Journal of Computer Systems Science Engineering, vol. 15, No. 5, Sep. 2000.

S. Angelov, P. Grefen; B2B eContract Handling—A Survey of Projects, Papers and Standards, CTIT Technical Report 01-21; University of Twente, 2001.

van den Heuvel et al., Cross-organizational Workflow Integration using Contracts Business Objects and Component Design and Implementation Conference, Oct. 16, 2000.

Levine, McLure "Business Process and Business Information Analysis Overview v1.0" UN/CEFACT and Oasis, May 11, 2001.

Anders, "ebXML Technical Architecture Specification v1.0.4" ebXML, Feb. 16, 2001.

* cited by examiner

METHOD AND SYSTEM FOR MANIPULATION OF COST INFORMATION IN A DISTRIBUTED VIRTUAL ENTERPRISE

CROSS-REFERENCE TO RELATED APPLICATIONS

The present application is related to the following applications, which are hereby incorporated by reference:

Application Ser. No. 10/112,529, filed (TBD), titled "Method and system for distributed virtual enterprise dependency objects";

Application Ser. No. 10/112,530, filed (TBD), titled "Method and system for a cloaking service for use with a distributed virtual enterprise";

Application Ser. No. 10/112,531, filed (TBD), titled "Method and system for distributed virtual enterprise project model processing"; and Application Ser. No. 10/112,536, filed (TBD), titled "Method and system for manipulation of scheduling information in a distributed virtual enterprise".

BACKGROUND OF THE INVENTION

1. Field of the Invention

The present invention relates to an improved data processing system and, in particular, to an automated electronic business practice. Still more particularly, the present invention is directed to a system and an application for interfacing with a marketplace for electronic commerce.

2. Description of Related Art

In recent years, a variety of electronic trading exchanges or electronic marketplaces have been developed that allow businesses to conduct transactions across the Internet. In general, these electronic marketplaces comprise a collection of separate business entities that voluntarily interface their private computer systems with the systems of other business entities in the pursuit of some collective purpose or service. In other words, buyers and sellers of goods and services organize themselves into a digital marketplace for cooperative exchange of goods and services. In fact, these services may include not only "real-world" services but also purely electronic or digital services. These electronic exchanges represent a neutral, centralized, beneficial, computer-mediated, marketplace in which competitors can conduct a limited portion of their business activities.

While some businesses offer proprietary middleware for facilitating the integration of existing legacy computer systems with these relatively new electronic marketplaces, there have been some initiatives towards reducing the complexity of these interfaces in order to reduce the cost of interacting with these electronic exchanges, thereby increasing the number of business organizations that might desire to participate in the exchanges. For example, the ebXML (electronic business extensible markup language) set of specifications has been developed for creating an electronic business infrastructure that is based on the exchange of XML-structured data. The widespread adoption of standardized protocols should allow business entities to interface with electronic exchanges with minimal cost and complexity. While the adoption of standards may simplify the transactions between business entities, it should be expected that these business entities will support multiple electronic exchanges for various competitive reasons as they seek advantages over other business entities.

The convergence of Internet-based electronic exchanges, application service providers, and e-businesses allows an enterprise to conduct business in an increasingly dynamic landscape. From one perspective, an electronic marketplace introduces an aspect of transparency or openness to otherwise opaque or secretive business transactions, although it should be expected that business entities will desire to maintain some level of opaqueness or confidentiality in their business transactions.

However, at the same time that business entities are interconnecting through these newly developed electronic exchanges in a web of electronic commerce, the employees within a business entity need the ability to dynamically control various internal aspects of an e-commerce transaction within the business entity.

Therefore, it would be advantageous to provide new methodologies for allowing individuals within a business entity to control e-commerce transactions from an internal perspective of the business entity while enabling a business entity to participate in external electronic marketplaces or electronic exchanges.

SUMMARY OF THE INVENTION

The convergence of Internet-based electronic exchanges, application service providers, and e-businesses enables the existence of a distributed virtual enterprise (DVE) in which a business entity has little or no physical assets and whose only e-commerce role is the ability to link various customers and suppliers in a proprietary mesh of business transactions. Even though electronic exchanges significantly reduce transaction costs and significantly increase the ability of business entities to gather competitive information, a virtual enterprise could still generate profits as an intermediate entity within these new electronic exchanges by protecting and employing institutional knowledge.

A business entity may transfer e-commerce agreements through an electronic marketplace. The business entity retrieves dependency information about a commercial transaction from an e-commerce agreement. The business entity incorporates the dependency information, e.g., dates, costs, deliveries, etc., as dependency relationships within a project model that represents a project for a product or service for sale by the first business entity. User input is received for manipulating a cost dependency relationship within the project model while constraining the user input to ensure that another type of dependency relationship is not incompatible with modifications to the cost dependency relationship.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

The present invention is a set of methodologies and techniques to be used in conjunction with one or more electronic marketplaces that may operate on a variety of data processing systems via a variety of networks. As background, a typical organization of hardware and software components within a distributed data processing system is described prior to describing the present invention in more detail.

Figure 1A:
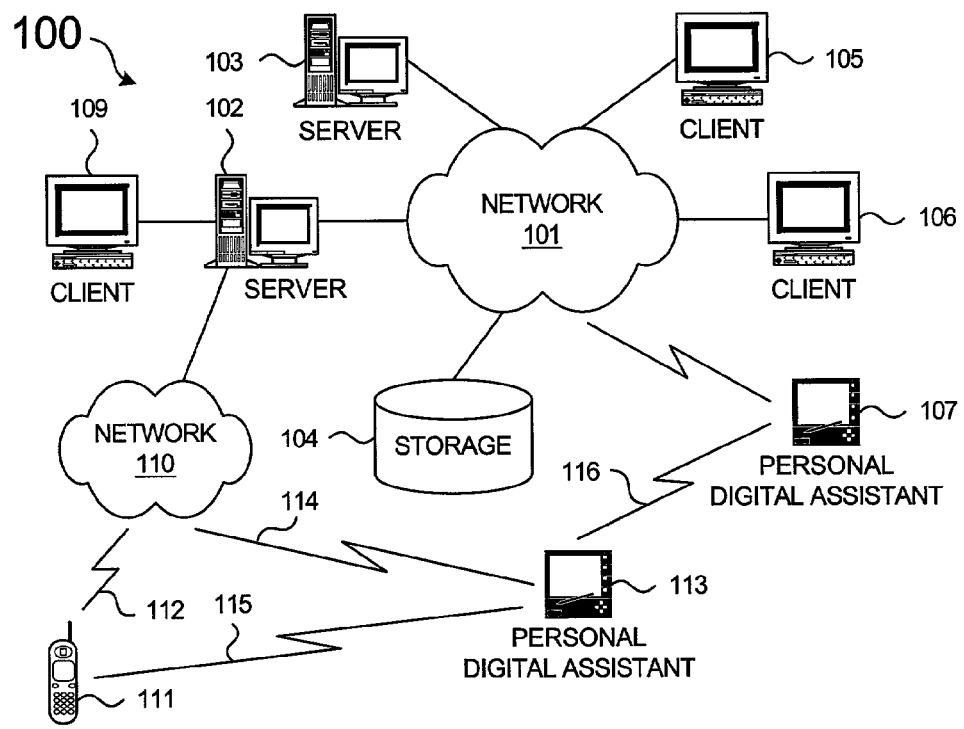
FIG. 1A depicts a typical distributed data processing system in which the present invention may be implemented.

With reference now to the figures, FIG. 1A depicts a typical network of data processing systems, each of which may implement some aspect of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown. It should be noted that the distributed data processing system shown in FIG. 1A is contemplated as being fully able to support a variety of peer-to-peer subnets and peer-to-peer services.

In the depicted example, distributed data processing system 100 may include the Internet with network 101 representing a global collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), a wireless LAN, or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
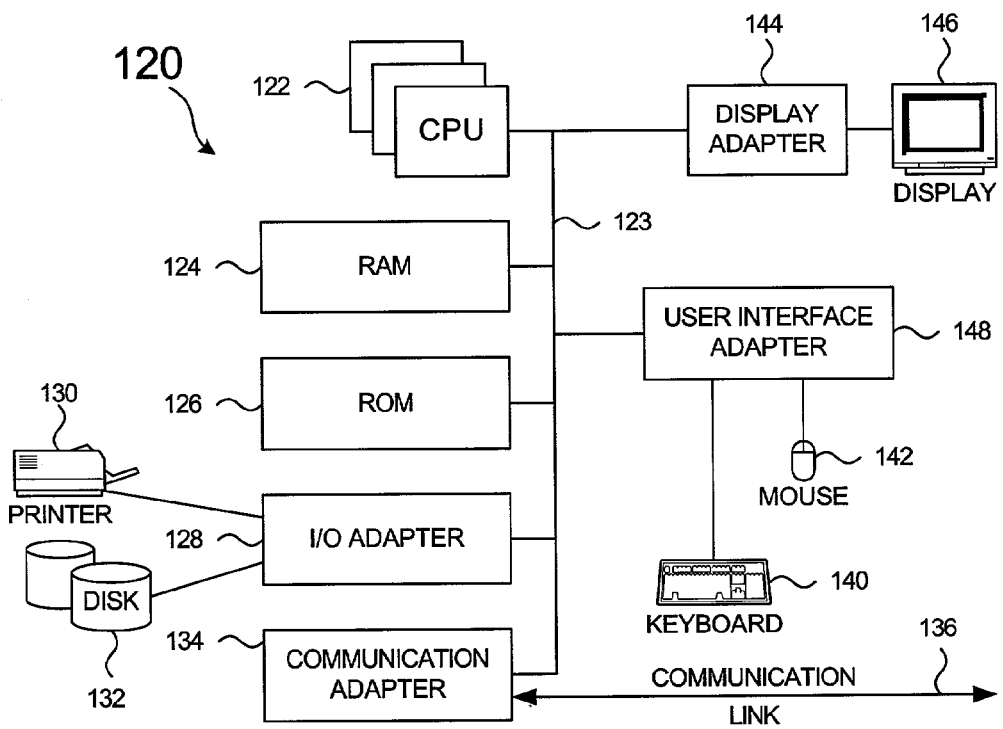
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140, mouse 142, or other devices not shown, such as a touch screen, stylus, or microphone. Display adapter 144 connects system bus 123 to display 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. In other words, one of ordinary skill in the art would not expect to find similar components or architectures within a Web-enabled or network-enabled phone and a fully featured desktop workstation. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Linux® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to a set of novel techniques to be used in conjunction with electronic marketplaces; typical electronic marketplace transactions are described prior to a detailed description of the present invention.

Figure 2:
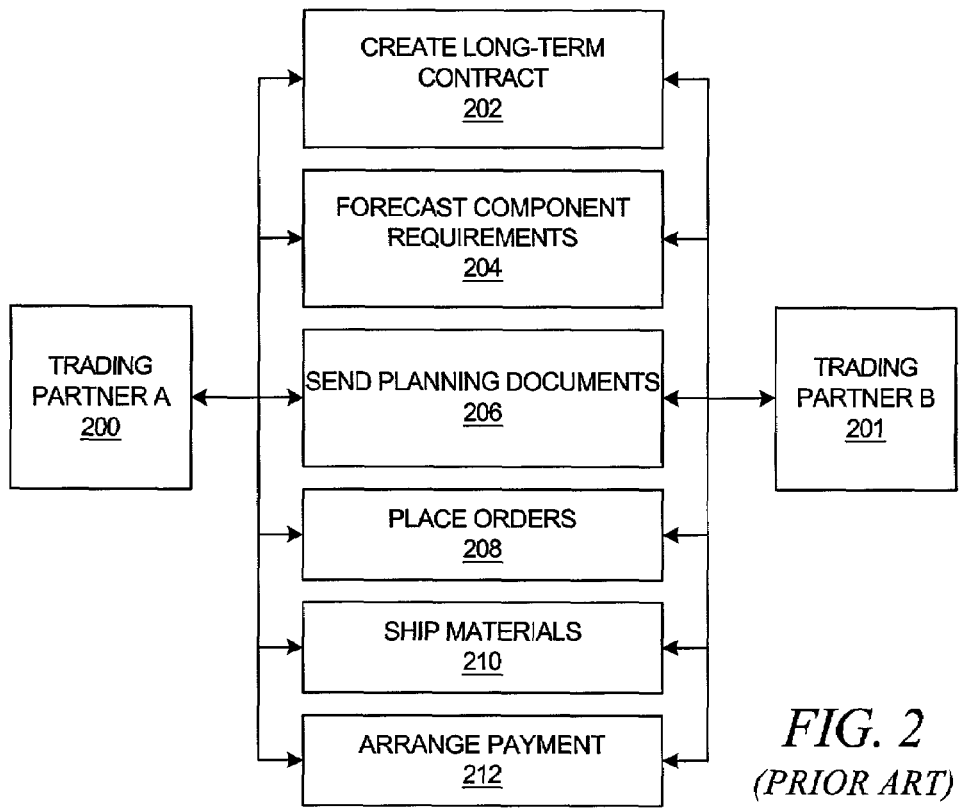
FIG. 2 is a block diagram that depicts typical data flow operations between business entities.

With reference to FIG. 2, a block diagram depicts typical data flow operations between business entities. Commercial transactions occur over a period of time, and each commercial transaction typically includes a set of actions by each party to the commercial transaction. These actions are typically recorded in a series of paper and/or electronic documents as evidence of the terms of agreement for completing the commercial transaction. During various phases of a commercial transaction, these documents are exchanged along with the corresponding goods, services, and financial transactions that comprise the commercial transaction.

FIG. 2 shows trading partner 200 and trading partner 201 that cooperate with each other to complete one or more commercial transactions in accordance with the typical data and material flow described below with respect to steps 202-212. FIG. 2 also depicts a partial list of the documents, other data, and possibly material goods that may flow between commercial entities during various phases of multiple commercial transactions. For example, a long-term contract (step 202) is created, thereby allowing the parties to a set of future commercial transactions to forecast their component requirements (step 204) for completing the set of commercial transactions and those operations that are dependent upon the completion of the set of commercial transactions. After agreeing to the overall terms of the set of commercial transactions, the commercial entities can also exchange planning documents (step 206) that describe the logistics for the actual exchange, deliver, or receipt of goods and/or services.

Each exchange or delivery within the set of commercial transactions may then be associated with a purchase order (step 208) that initiates a particular commercial transaction, which includes an order and a shipment of materials (step 210) in this example. After the receipt of the materials, then a financial transaction occurs as payment (step 212) for the particular transaction. Multiple transactions may subsequently occur in accordance with the previously negotiated long-term contract.

Figure 3:
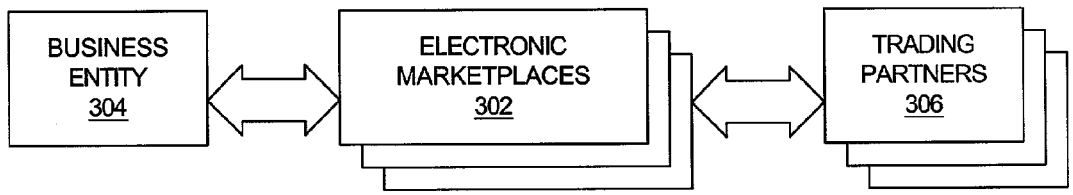
FIG. 3 is a block diagram that depicts the use of a typical ebXML-compliant (electronic business eXtensible Markup Language) electronic marketplace between trading partners.

With reference now to FIG. 3, a block diagram depicts the use of a typical ebXML-compliant electronic marketplace between trading partners. A plurality of electronic marketplaces/exchanges have been developed that use the Internet and World Wide Web to facilitate e-commerce among commercial entities; these electronic marketplaces coordinate the communication of multiple types of transactions and document types that may be exchanged between business entities, as depicted in FIG. 2. As shown in FIG. 3, an electronic marketplace can be implemented in accordance with the suite of ebXML (electronic business eXtensible Markup Language) specifications that are promulgated by UN/CEFACT (United Nations Center for Trade Facilitation and Electronic Business) and the OASIS (Organization for the Advancement of Structured Information Standards) consortium such that the electronic marketplace is available for use by a commercial entity that accomplishes some or all of its commercial transactions using ebXML-compliant processes and data interchange. For example, ebXML-compliant electronic marketplaces 302 are open to commercial entities, such as business entity 304 and its trading partners 306, for electronic collaboration processes. More information about ebXML can be found in the following documents which are hereby incorporated by reference: *ebXML Technical Architecture Specification* v.1.04, February 2001; *Business Process and Business Information Analysis Overview* 1.0, May 2001.

Figure 4:
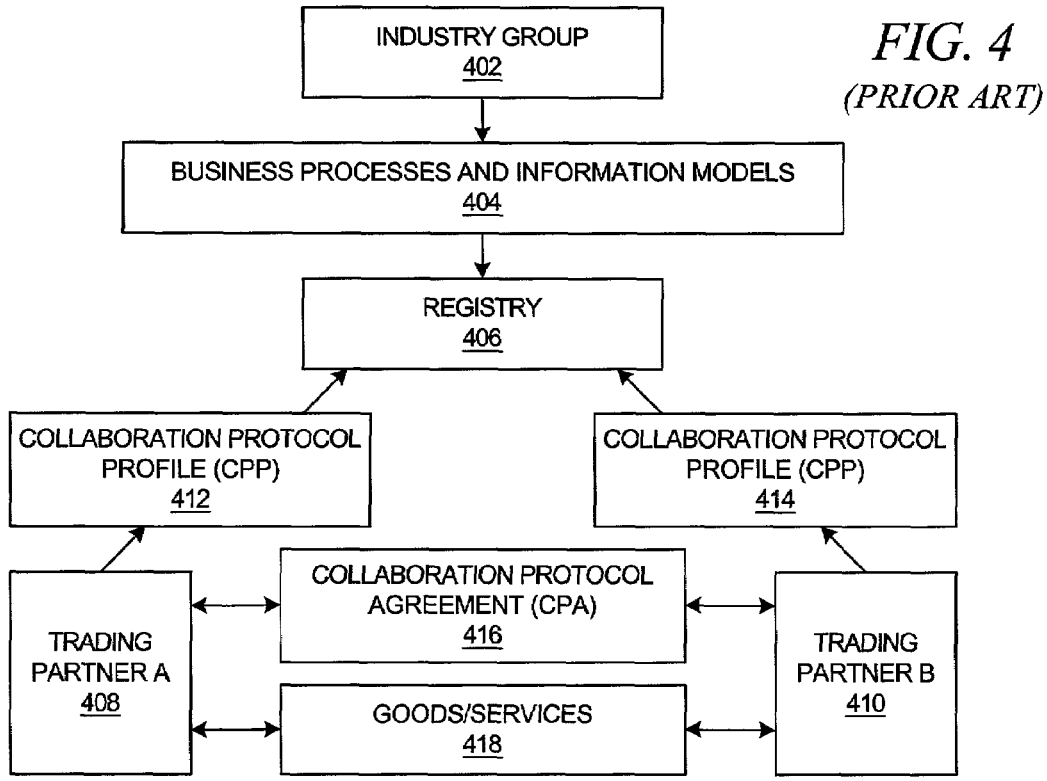
FIG. 4 is a block diagram that depicts a set of commercial entities and data elements that are used to describe a typical electronic business collaboration in accordance with processes and events that are defined within the ebXML set of specifications.

With reference now to FIG. 4, a block diagram depicts a set of commercial entities and data elements that are used to describe a typical electronic business collaboration in accordance with processes and events that are defined within the ebXML (electronic business eXtensible Markup Language) set of specifications. Industry group 402 defines a set of business processes and information models 404 that can be used to describe, to structure, and to conduct commercial transactions in an industry-specific manner. These processes and models are then stored in registry 406 for the benefit of any commercial entity that desires to conduct an electronic business collaboration with another commercial entity using the defined processes and models. Alternatively, the business processes and information models may be controlled within an electronic business library that contains a catalog of these types of business documents such that the registry is directed more towards runtime activities.

Trading partners 408 and 410 represent a pair of commercial entities that use registry 406 in an electronic collaboration. Each trading partner generates a collaboration protocol profile (CPP), e.g., CPP 412 or CPP 414, that is stored in registry 406. Commercial entities can peruse the CPPs from other commercial entities to determine whether or not to enter into an electronic collaboration.

The activities related to defining and registering the business processes, the information models, and the CPPs may be considered to be "design time" activities that support "run time" activities of actual electronic collaborative activities. When two commercial entities decide to become trading partners, they exchange a collaboration protocol agreement (CPA), e.g., CPA 416, that defines the terms to which the parties have agreed for a particular collaborative activity. In this example, the trading partners may exchange goods and/or services 418 during their collaborative activity. Although FIG. 3 and FIG. 4 depict examples of electronic commerce activities with respect to an ebXML-compliant marketplace, it should be noted that the present invention is able to be implemented with respect to specifications for a variety of electronic marketplaces/exchanges.

As noted previously, a major advantage of the recent development of Web-enabled electronic marketplaces is the ability to facilitate information exchange among trading partners. By using standard communication protocols (e.g., HTTP), standards for structured information (e.g., XML), and standards for the exchange of commercial information (e.g., ebXML), these electronic marketplaces enable commercial entities to find other commercial entities which desire to engage in mutually beneficial commerce. However, an electronic marketplace operates between enterprises, so while electronic marketplaces provide a business entity with external interfaces to other business entities, there are many data processing operations that an enterprise may need internally with respect to its own proprietary data.

The present invention recognizes that a business entity needs internal applications and systems that allow personnel within a business entity to manipulate proprietary data in a manner that is consistent with the electronic agreements to which the business entity has committed itself within an electronic marketplace. Rather than constructing a middleware application to tie together disparate information systems containing supply-chain management information and electronic marketplace transaction information, the present invention assists in maintaining consistent relationships between cost information, schedule information, and electronic transaction information, as discussed below with respect to the remaining figures.

Figure 5:
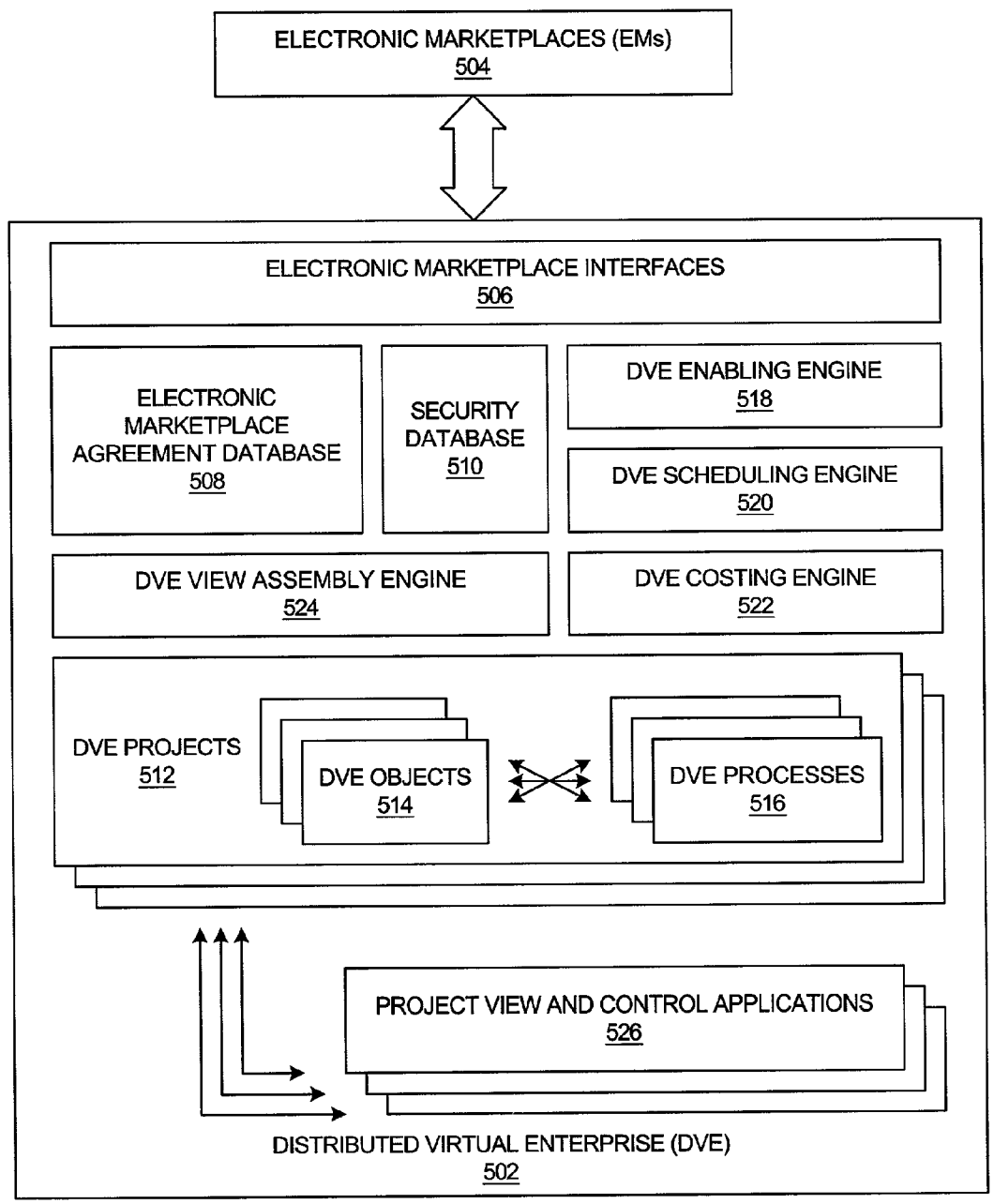
FIG. 5 is a block diagram that depicts a distributed virtual enterprise in accordance an embodiment of the present invention.

With reference now to FIG. 5, a block diagram depicts a distributed virtual enterprise in accordance an embodiment of the present invention. Distributed virtual enterprise (DVE) 502 participates in e-commerce transactions in multiple electronic marketplaces 504 through electronic marketplace interfaces 506. As noted above, different electronic marketplaces may be implemented using a variety of well known specifications; hence, DVE 502 may require components to generate and receive e-commerce information in accordance with the particular standards that are used in the different electronic marketplaces. As DVE 502 commits itself to various electronic agreements, e-commerce transactions, etc., such as CPA 416 shown in FIG. 4, these agreements are stored in e-commerce agreement database 508. Appropriate authorizations for manipulating these agreements and other proprietary data within DVE 502 is stored in security database 510.

The e-commerce activities of DVE 502 are supported through the use of DVE projects 512, DVE objects 514, and DVE processes 516. A DVE project contains one or more DVE objects. Each DVE object is an encapsulation of information concerning physical goods, physical services, electronic services, or combinations of these goods and services with DVE processes for describing a particular component that can be obtained or a particular task that can be accomplished in furtherance of the DVE project in which it is contained. A DVE process is a container of one or more steps or procedures that are performed in furtherance of the DVE project in which it is contained. The DVE projects, DVE objects, and DVE processes can be created, viewed, and modified through DVE enabling engine 518, DVE scheduling engine 520, DVE costing engine 522, and DVE view assembly engine 524 using project view/control applications 526, as described in more detail further below.

The manner in which an enterprise uses the DVE infrastructure may depend upon a variety of considerations, such as the enterprise's organizational structure or the mission statement of the enterprise. In general, a DVE project might be implemented for each product or service that is offered for sale by the enterprise, but a DVE project could be implemented for a sales goal that spans many products or services within a division of the enterprise. In other words, the appropriateness of a DVE project is determined by the enterprise and not by the technical implementation of the present invention.

Figure 6:
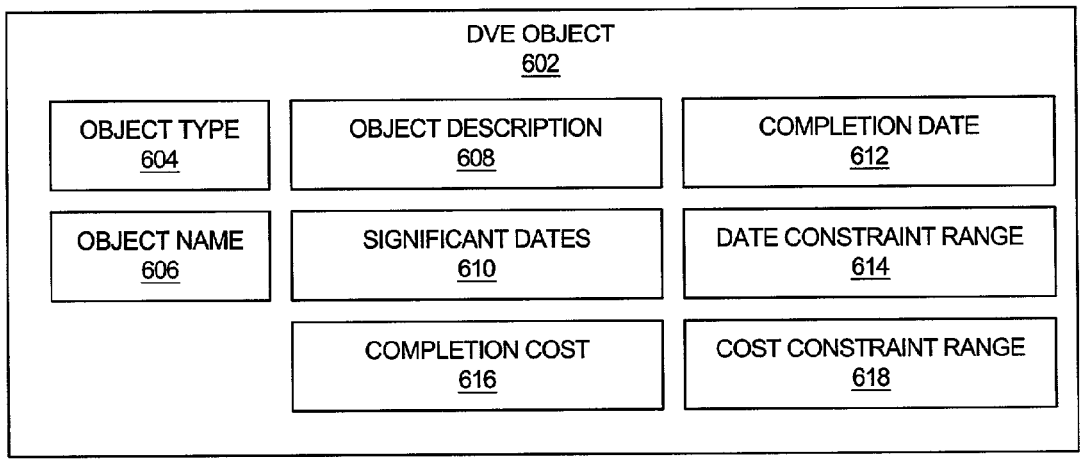
FIG. 6 is a block diagram that depicts some of the data items that may be included within a DVE object in accordance with an implementation of the present invention.

With reference now to FIG. 6, a block diagram depicts some of the data items that may be included within a DVE object in accordance with an implementation of the present invention. In the example shown in FIG. 6, DVE object 602 comprises multiple data items: type 604, which may refer to a programmatic object type for an e-commerce service or to a class of physical object or physical task; name 606 for identifying the DVE object; description 608 for a string containing alphanumeric data for describing the DVE object; significant dates 610, such as important milestone dates during the active lifetime of the DVE object with respect to its DVE project; completion date 612 indicating the currently projected completion date for the component or task represented by the DVE object based on other characteristics of the DVE object; date constraint range 614 indicating the earliest and latest possible completion dates for the component or task represented by the DVE object; completion cost 616 indicating the current completion cost for the component or task represented by the DVE object based on other characteristics of the DVE object; and cost constraint range 618 indicating the maximum and minimum possible costs for the component or task represented by the DVE object. Other data items, properties, and methods could be included within a DVE object depending upon the implementation of the DVE system.

In one embodiment, a set of DVE objects can represent an encapsulation of parts or process steps in order to define the specifics of a product component. A set of DVE processes can represent components, steps, and procedures for the creation of a defined result of particular importance to a DVE project. For example, various manufacturing steps, processes, and parts could be aggregated into a set of DVE processes, and the DVE processes could be linked together via temporal and/or positional/ordering relationships within a DVE project. A DVE project can then integrate the dates, costs, marketing assumptions, and negotiated agreements for a product or service. The project can be displayed in a number of formats using various GUI console applications, such as applications 526 shown in FIG. 5. To model potentially desirable changes in a given project, a copy of a project manipulated within an application, and the application can honor the constraining dependency relationships among the data items. If necessary, the dependency relationships can be broken in order to model other completion scenarios, and the copy of the project completion model with the modified DVE relationships can be saved for viewing and/or analysis by other enterprise personnel and/or applications in order to determine the feasibility, profitability, desirability, etc., of alternate project completion scenarios. For example, a sales manager could create alternate projects with different costs and schedules that may represent different profit and/or marketing goals, and a manufacturing manager could then review and/or modify the alternate scenarios to provide a manufacturing perspective on those scenarios.

A major advantage of the present invention is the fact that the individual data items that are stored within a given DVE object, DVE process, or DVE project can be derived from actual e-commerce transactions and/or agreements. Hence, the cost and scheduling constraints that are manipulated by the viewer applications represent the constraining relationships and/or dependencies within the e-commerce agreements to which the enterprise has committed within an electronic marketplace. In this manner, various enterprise personnel do not waste time and resources analyzing project scenarios that might be desirable or feasible from the enterprise's perspective yet violate negotiated agreements; in other words, the alternate project scenarios might be undesirable or unfeasible from a trading partner's perspective. When alternate project scenarios are found to be particularly compelling to an enterprise, however, then the present invention provides the ability to automatically generate modified e-commerce agreements, thereby providing a basis for automated renegotiation of those e-commerce agreements.

Figure 7:
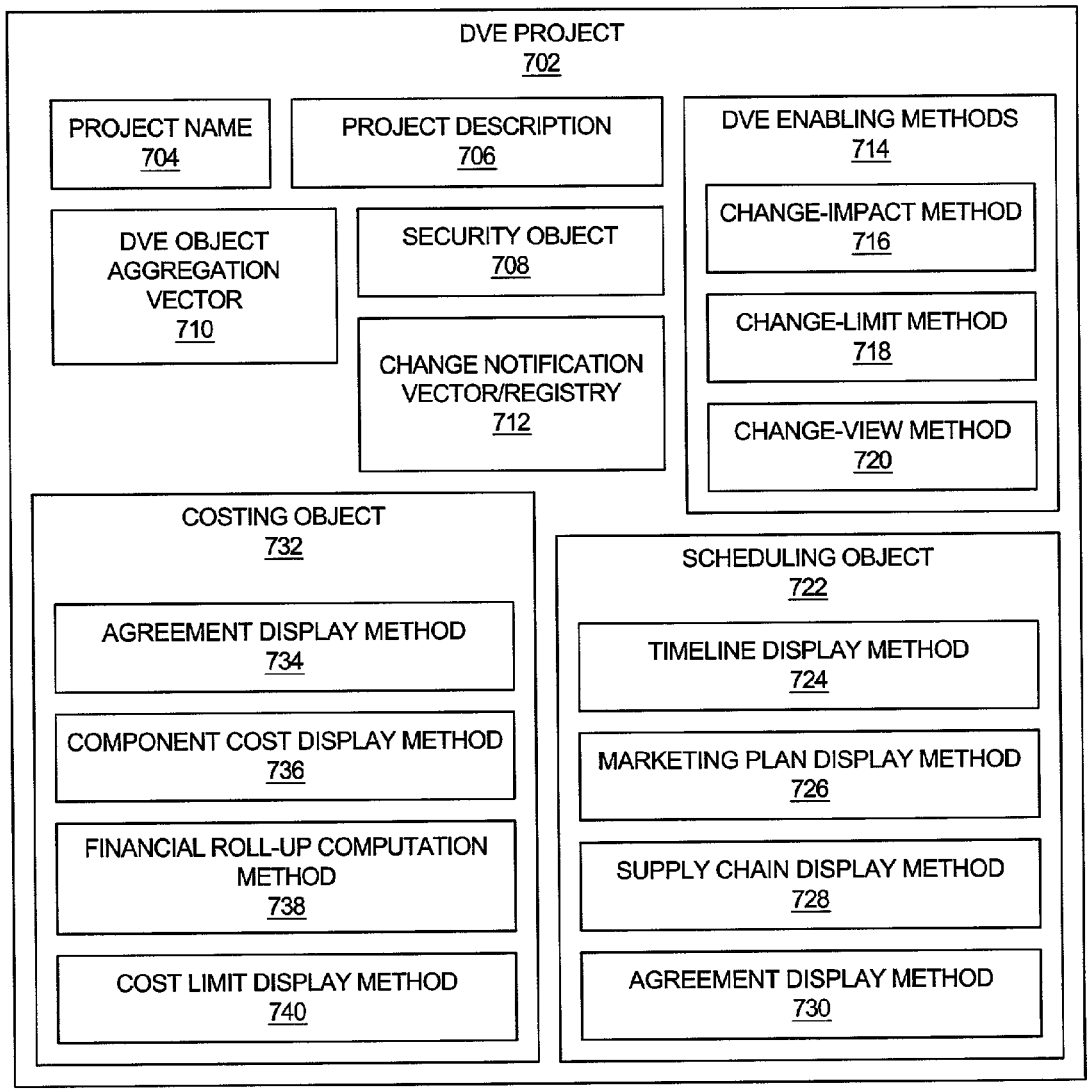
FIG. 7 is a block diagram that depicts some of the data items and methods that may be included within an object-oriented DVE project in accordance with an implementation of the present invention.

With reference now to FIG. 7, a block diagram depicts some of the data items and methods that may be included within an object-oriented DVE project in accordance with an implementation of the present invention. To create a system that will enable and constrain the efficient functioning of a DVE, the present invention supports an application environment that allows for rapid adjustment and evaluation of various aspects of developing, manufacturing, selling, and marketing products or services. Depending upon the system implementation, various DVE project classes and subclasses could be created and used, but FIG. 7 shows an example of an object-oriented DVE project model. Other data items, properties, and methods could be included within a DVE project depending upon the implementation of the DVE system.

DVE project 702 may be implemented as an object with included data items and methods for operating on the object. DVE project name 704 identifies a particular project among multiple projects that a DVE may have active at any given time. DVE project description 706 provides a summary of the product or service that is being developed within a given project object. Security object 708 supports various security issues with respect to a given project, such as the determination of the authorization of role access or group access to a given project for particular enterprise personnel. DVE object aggregation vector 710 is a vector of the DVE objects that comprise the DVE project, as described above.

Change-notification vector or registry 712 is an aggregation of the DVE components that require notification of changes or modifications to the DVE project; as described in more detail below, various completion scenarios for the DVE project can be performed by authorized personnel, and whenever a modification to a DVE project is requested by committing an alternate completion scenario for the DVE project, the change-notification registry determines what other components, projects, trading partners, etc., need to be notified of the modification. DVE enabling methods 714 are the supporting methods for modifying a DVE project. As an example, change-impact method 716 is responsible for determining the DVE objects and e-commerce agreements that would be impacted based on proposed change to a DVE project, thereby allowing an enterprise employee to understand whether a proposed change is far-reaching in its effects. If the enterprise has associated multiple DVE projects, then the impacts of a change on a particular project could be cascaded through associated projects to view enterprise-wide impacts, which would be helpful for understanding enterprise-wide resources, such as assembly-line utilization, etc.. Change-limit method 718 is responsible for allowing an enterprise employee to place a limit or lock on a particular DVE object such that it remains invariable while proposed changes to other DVE objects or DVE projects are contemplated. Change-view method 720 supports the multiple views that are permitted on a DVE project, which are described in more detail below.

Scheduling object 722 encapsulates known aspects of project scheduling for DVE project 702, particularly with respect to business policies, goals, and considerations of the DVE enterprise that is implementing the project represented by DVE project 702. Timeline display method 724 supports the viewing and manipulation of various aspects of the schedule dates associated with DVE project 702.

Marketing plan display method 726 supports the viewing and manipulation of marketing information that can be derived from DVE project 702. For example, key schedule dates that might be useful for marketing a product or service can be tagged, highlighted, restricted, or controlled by marketing personnel such that these schedule dates cannot be manipulated from a financial or technical perspective without consulting marketing personnel because advertisements and other marketing material will be produced or distributed based on these schedule dates. Since the enterprise may have contracts or other types of agreements with various marketing-related trading partners, such as creative agencies or publishing companies, the integration of marketing considerations into the DVE project object allows all possible enterprise-wide affects to be viewed and manipulated along with financial and technical aspects of a project.

Supply chain display method 728 supports viewing and manipulation of supply-chain information with respect to DVE project 702. Although each supply-chain component can be represented by an individual DVE object that is able to be viewed and manipulated like other DVE objects, supply chain display method 728 allows particular emphasis to be placed on a supply-chain as a whole such that an entire supply-chain can be viewed and manipulated. This is particularly helpful to enterprise personnel because physical components for a project cannot be manipulated like various abstract properties and considerations, such as policy or marketing goals, which makes the supply-chain more important in many respects. As an example, certain processes must have a physical component on which to operate, and the non-existence of the physical component cannot be considered as acceptable; for instance, a video-game controller might be useless without a CD-ROM drive, and the supply-chain that provides the CD-ROM drive would be considered as critical to certain production milestones. In contrast, certain financial goals can be manipulated by management even if the impact is determined to be clearly negative. For example, management can decide to produce and sell an unprofitable video-game controller system as one DVE project, whereas as a different set of profitable DVE projects for software game titles can be scheduled for sale after the delivery of the associated video-game controller. The manipulation of the financial goals of the various DVE projects is an abstract consideration that can be controlled as desired by the enterprise management, whereas possession of physical components for the physical system to be sold is not an option that can be controlled by the enterprise management.

Agreement display method 730 supports viewing and manipulation of significant dates within the e-commerce agreements to which an enterprise has committed itself within an electronic marketplace in support of DVE project 702. Since the enterprise may have many contracts or other types of agreements with various trading partners, the integration of legal or e-commerce transaction considerations into the DVE project object allows all possible e-commerce affects to be viewed and manipulated along with financial and technical aspects of a project. For example, after contemplating a schedule change to a component in DVE project 702, the enterprise management may discover that the schedule change is easily accomplished from a technical perspective. Upon further consideration, management may determine that the contemplated change provides a larger profit, and the management may desire to implement the contemplated change. With agreement display method 730, the enterprise management would be able to determine whether the contemplated change would require few or many e-commerce agreement changes. Without such information, the enterprise management might commit itself to a new completion scenario for DVE project 702. However, with such information, the management might be able to understand that a large number of agreements are going to be changed to accomplish the new completion scenario, which increases the risks that the new completion scenario might not be completed in accordance with the contemplated schedule. In other words, agreement display method 730 allows the management to view the enterprise's dependence on external trading partners in the electronic marketplace, which inherently comprises risks that are outside of the control of the enterprise.

Costing object 732 encapsulates known aspects of project cost considerations for DVE project 702, particularly with respect to business policies, goals, and considerations of the DVE enterprise that is implementing the project represented by DVE project 702. In a manner similar to agreement method 730 in scheduling object 722, agreement display method 734 supports viewing and manipulation of significant costs within the e-commerce agreements to which an enterprise has committed itself within an electronic marketplace in support of DVE project 702. Component cost display method 736 supports the viewing and manipulation of individual costs that are associated with DVE project 702 and its DVE objects. Financial roll-up method 738 supports the viewing and manipulation of costs that are associated with various subsystems or other object groupings within DVE project 702. This particular method is useful for various intra-project cost considerations, such as whether the cost of a set of components within DVE project 702 might be easily reduced by replacing the set of components with a single subsystem that could be purchased by a trading partner within an electronic marketplace. Cost limit display method 740 supports a function in which an enterprise employee can place a limit or lock on the cost of a particular DVE object such that it remains invariable while other proposed cost changes to other DVE objects or DVE projects are contemplated.

Figure 8:
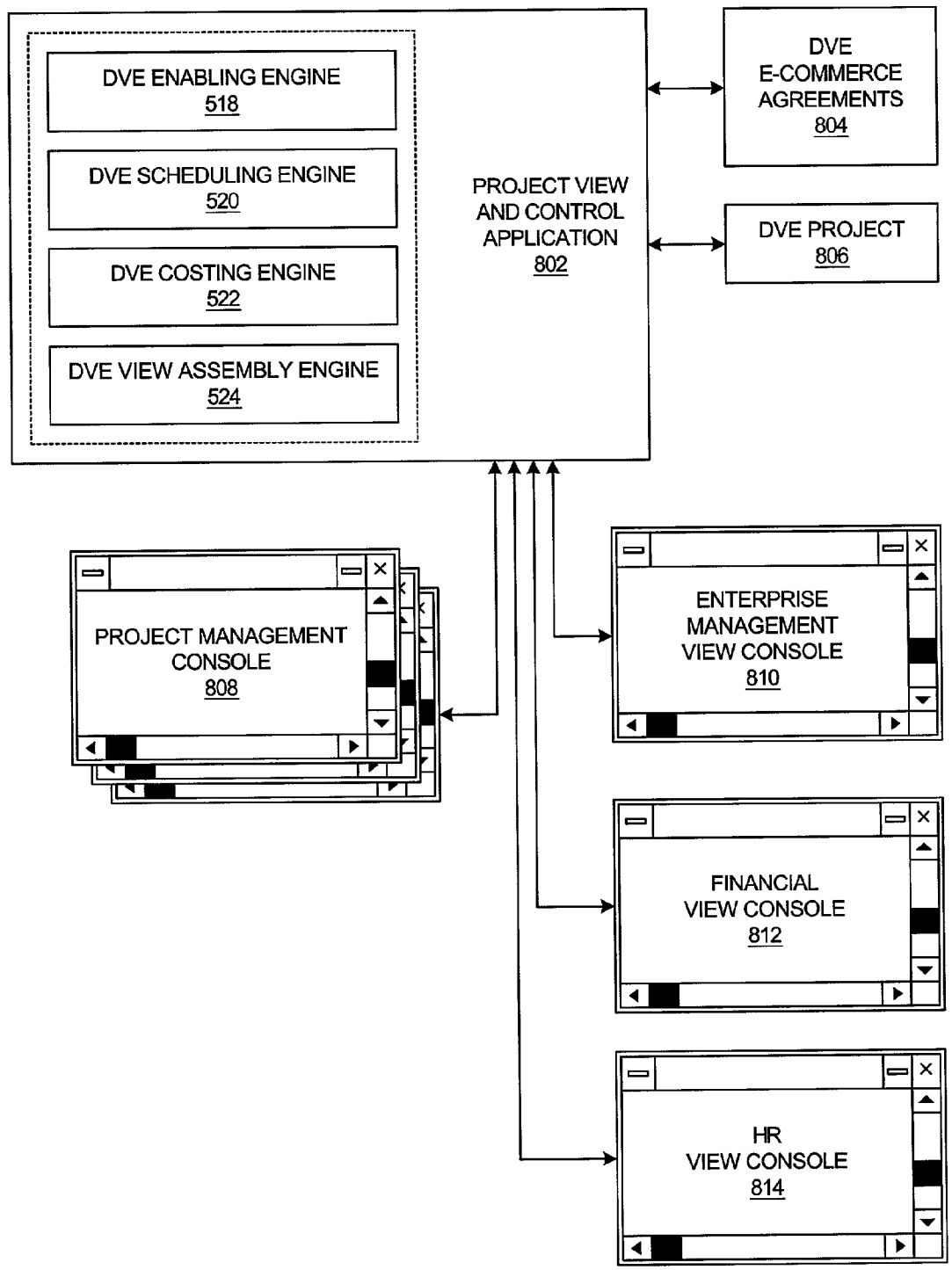
FIG. 8 is a block diagram that depicts an application supporting various GUI views of the information derived from a DVE project.

With reference now to FIG. 8, a block diagram depicts an application supporting various GUI views of the information derived from a DVE project. Another major advantage of the present invention is that the DVE infrastructure supports DVE views, which allow enterprise personnel to execute "pulls", i.e., specific extractions of information, against DVE projects for specific purposes. This allows different employees to view the project in terms of their participative role within the project or organization, thereby allowing an employee to think of the project in their own restricted terms.

As mentioned above with respect to FIG. 5, DVE projects, DVE objects, and DVE processes can be created, viewed, and modified through DVE enabling engine 518, DVE scheduling engine 520, DVE costing engine 522, and DVE view assembly engine 524 using project view/control application 802. The project view and control application invokes methods within the DVE engines as necessary to incorporate functionality for processing various DVE objects. In particular, information from multiple DVE e-commerce agreements 804 and a particular DVE project 806 can be retrieved for viewing and manipulating within project management console 808, enterprise management console 810, finance console 812, and human resource console 814. Other views could be supported in accordance with the organizational structure of the enterprise, the structure of the project, or various other considerations. In one embodiment, the DVE engines can create XML representations of specified aspects of the DVE projects for viewing within browser-like applications. The types of views that are created and the types of changes that are allowed may depend upon the user's authorization parameters as controlled by the security objects within a DVE project or by the overall security subsystems that are employed by the enterprise.

As mentioned above, various types of completion scenarios for a DVE project can be contemplated by enterprise personnel by generating a copy of a DVE project and then manipulating various aspects of the DVE projects, such as costs and schedule dates. The contemplated changes could be factual, such as pre-negotiated real increases in price that are derived from proposed e-commerce agreements. In other cases, the contemplated change may be a estimates based upon heuristics, such as expected labor rates. For purely fictional scenarios, the contemplated changes may be flagged as such; parameters would be attached to DVE objects for subsequent actions to be taken to determine whether the fictional changes could be implemented, such as requiring a purchasing agent to call a supplier or initiating an automated query that must be answered within a preset time limit.

The various views of the DVE projects could be tailored for specific roles within the enterprise, as illustrated in the following scenario concerning the manipulation of market delivery information.

In this example, a marketing manager receives a market survey report stating that reductions in capital spending are abating and that spending for IT resources should grow substantially in the following fiscal quarter. The marketing manager opens a DVE-enabled application with a marketing view of a DVE project in accordance with the marketing manager role of the employee as supported by the DVE view assembly engine. The marketing manager may see that the DVE project is on schedule for delivery later in the fiscal year, which would miss significant sales opportunities in the next fiscal quarter. In order to capture those sales opportunities, the marketing manager uses the marketing view to manipulate alternative completion scenarios for the DVE project to see whether the completion dates for the DVE project can be set within the next fiscal quarter. The DVE-enabled application uses the DVE scheduling engine to determine whether the requested completion dates that are input by the marketing manager using GUI objects within the marketing view are valid given the constraints that are built into the DVE objects within the DVE project.

A purchasing agent's view of the DVE project may show that the newly proposed completion dates can only be accommodated by acquiring parts at an earlier date than had previously been negotiated with a trading partner. The purchasing agent's could request an accelerated delivery schedule for parts, and the purchasing agent's view would highlight dependencies on allocation of storage space. If the storage space is over a tolerance constraint set in the DVE objects, the marketing manager could get a notification for review of the DVE project based on a potential delay being introduced for a decision or information required from purchasing. After the purchasing agent is able to provide the space, the DVE project would signal reconciliation, register the change, and notify the marketing manager that the potential delay had been resolved.

The personnel manager's view, i.e. the human resources view, would be able to show that a contemplated or proposed change introduces a requirement for a number of hours of labor from machinists who need to work on a specific physical component; the number of hours may be a non-negotiable dependency condition in a particular DVE object, and the personnel manager is not able to substitute other skilled workmen for a particular task based on labor union agreements. Hence, if the personnel manager decides to implement the proposed change, additional labor must be made available either from the union pool or from another project. In this manner, the requirements of one DVE project would ripple into the another DVE project within the enterprise. Therefore, prior to implementing the proposed change, the personnel manager might need to obtain authorization from other managers that are responsible for other DVE projects.

At later some point in time, the financial manager's view would show the accumulated cost effects of the consequences of the proposed changes that are being contemplated or requested by the purchasing agent or the personnel manager. The expected income from the DVE project for the next month could be displayed within the financial manager's view in addition to the increased shipping costs from the early ship date requested by the purchasing agent and the increased labor costs due to additional overtime and additional personnel as determined from labor union agreements and approved by the personnel manager. In addition, the financial manager could view other impacted DVE projects, such as the delay in the ship date of the other DVE project that would suffer from a reduction in personnel in addition to a projected revenue decline for the other DVE project. The financial manager can reject the proposed change, but if the proposed change is accepted, then consequences of the accepted change cascades through the DVE objects within the DVE project and any other impacted DVE projects.

As mentioned above, a major advantage of the present invention is the fact that information within DVE objects, DVE processes, or DVE projects can be derived from actual e-commerce transactions and/or agreements. As described briefly in the example above, proposed changes are accepted or rejected by those managers who are responsible for various dependency relationships within DVE projects. At the same time, proposed changes to e-commerce agreements can be initiated, negotiated, and accepted. In the prior art, these actions within the electronic marketplaces would be separate considerations that would not be electronically integrated into the decision-supporting applications within an enterprise; in contrast, with the present invention, the dependency relationships that are created by an enterprise's e-commerce agreements for acquiring goods and services are integrated along with the other dependency relationships within the enterprise that are necessary for ensuring the successful completion scenario for a DVE project. This advantage is illustrated in the following scenario concerning the manipulation of cost efficiency information.

In this example, a purchasing agent examines if switching to a cheaper power supply will decrease the cost of a DVE project. The purchasing agent opens a DVE-enabled application with a purchasing view of the DVE project in accordance with the purchasing agent role of the employee as supported by the DVE view assembly engine. The purchasing agent can add another vendor of power supplies to the DVE project, thereby creating a new DVE object within the DVE project. The DVE enabling engine will register the change and will associate the new DVE object through appropriate relationships to other DVE objects by notifying the other DVE objects of the presence of the new DVE object within the DVE project.

The current contract for power supplies contains prearranged drop shipments. The DVE object for the power supplies indicates that a proposed change in the provided quantity requires a full renegotiation of contract terms and does not include a previously negotiated change in price for different quantities. The current supplier has fixed terms of contract termination which impose high penalties, and this type of information could be displayed on the financial manager's view of the DVE project. At the same time, alternate DVE objects could have been derived from available information within an electronic marketplace, such as a proposed CPA from a different supplier. In this example, the DVE object for the alternate supplier does not impose a high change penalty, and the financial manager's view shows that the proposed change in the DVE project can use the reduction in the contract amount with the alternate DVE object to offset the penalties that are imposed by the current supplier, as determined by the DVE costing engine. Hence, the financial manager may give a qualified approval to the proposed change such that the proposed change is forwarded to the other DVE objects in the DVE project based on the dependency relationships among the objects, which may be assisted by the change-notification registry. One dependency for the power supply DVE object may indicate that product engineering has a requirement that all power supplies must meet rugged military-level specifications. If such information is missing from the e-commerce agreement associated with the proposed power supply, then a purchasing agent might be notified to communicate with the alternate supplier to determine the technical specifications of the proposed power supply. After a purchasing agent has verified that the proposed power supply meets these requirements, then an engineering manager may provide engineering approval. After a financial manager has approved the change in forecasted profits, the proposed change could be accepted, and the appropriate e-commerce agreements and/or transactions could be initiated within the electronic marketplace.

Figure 9:
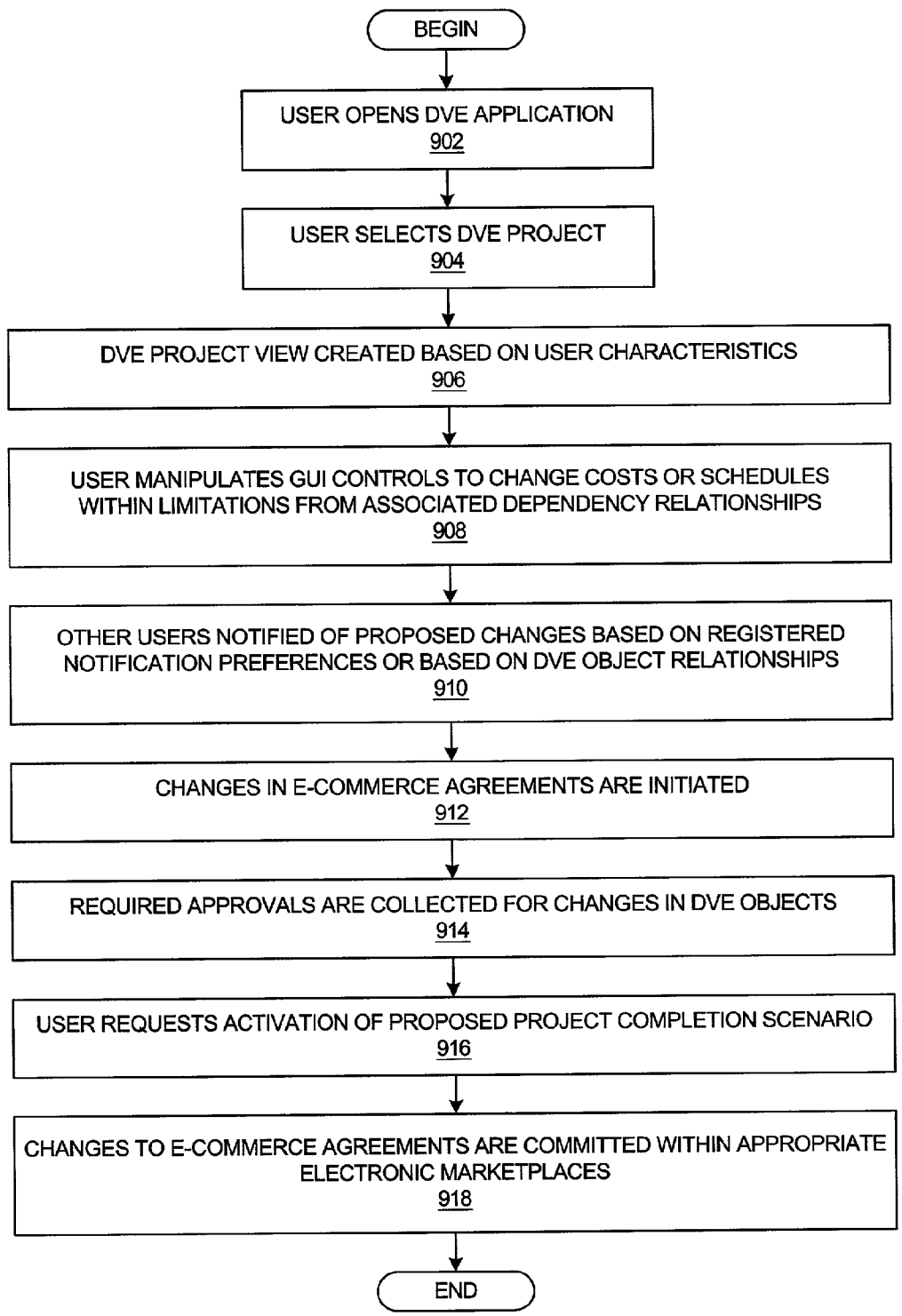
FIG. 9 is a flowchart that depicts a process for using the DVE project views that are provided by DVE-enabled applications.

With reference now to FIG. 9, a flowchart depicts a process for using the DVE project views that are provided by DVE-enabled applications. The process begins with a user, such as an enterprise employee, opening a DVE-enabled application (step 902). The user selects a DVE project (step 904), and an appropriate DVE project view is created (step 906); as noted above, the user may be restricted to the types of views that may be accessed by the user based on the user's employee group or role. The user then manipulates the GUI controls/objects of the DVE-enabled application that represent DVE object to investigate possible changes to costs, schedule dates, or other DVE object properties as desired (step 908). The ability of the user to manipulate these parameters are limited by the DVE-enabled application such that the dependency relationships among the DVE objects are maintained.

When the user has determined to propose a change in a DVE project, other users and/or objects are automatically notified based on registered notification preferences in the DVE project or based on the DVE object relationships among those DVE objects that are affected by the proposed change (step 910). In addition, changes to the appropriate e-commerce agreements are also initiated within the appropriate electronic marketplaces in accordance with the proposed change to the DVE project (step 912). The required approvals are subsequently collected by the DVE-enabled application (step 914), after which the user can request activation of the proposed change such that the proposed change is incorporated into the project completion scenario (step 916). The required approvals would also include the arrangement of potential e-commerce agreement modifications, and the activation of the proposed change would initiate the commitment of the enterprise into new agreements within an electronic marketplace (step 918).

Figure 10:
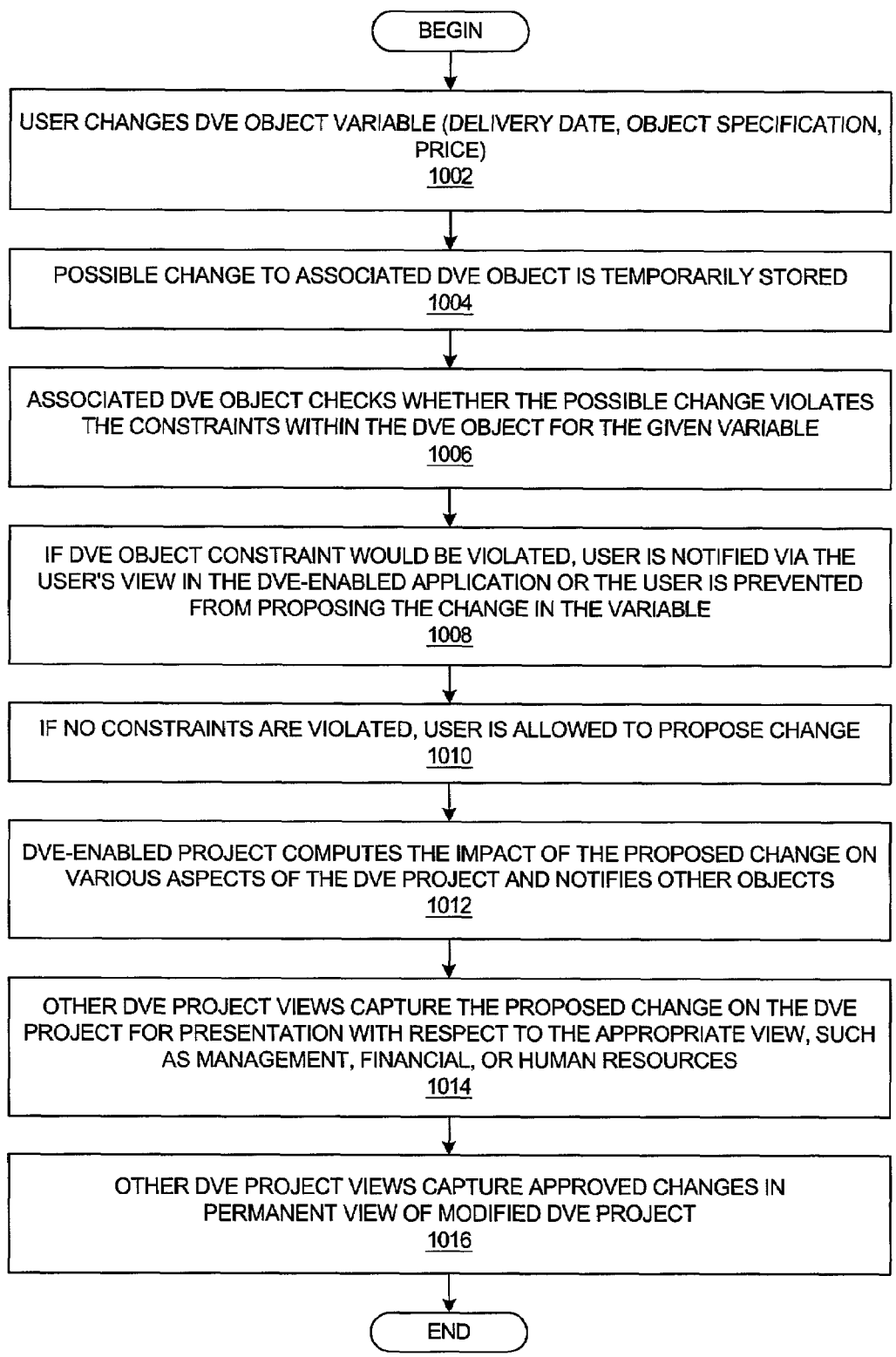
FIG. 10 is a flowchart that depicts a more detailed process by which a DVE project examines the dependency relationships among its DVE objects for a proposed change in a DVE project.

With reference now to FIG. 10, a flowchart depicts a more detailed process by which a DVE project examines the dependency relationships among its DVE objects for a proposed change in a DVE project. A user is able to manipulate GUI controls/objects that represent DVE objects, and the variations in the parameters of the GUI objects represent changes in the variable values within a DVE object, such as delivery date, object specifications, or costs associated with a DVE object (step 1002). When a user has input a possible change to an associated DVE object, the potential change is temporarily stored (step 1004).

The associated DVE object then checks whether the possible change violates the constraints within the DVE object for the given variable that might be changed (step 1006). If the constraint for the variable within the DVE object would be violated, then a graphical indication within the user's view in the DVE-enabled application could be presented to notify the user that the potential change is not possible based on a particular constraint, or the user is simply prevented from manipulating the GUI objects or controls in the user's view through which a user would request the change (step 1008), thereby preventing the user from proposing the change in the variable. For example, if a user is sliding a GUI object along a graphical timeline to change the schedule dates associated with a DVE object, the DVE-enabled application would prevent the user from moving the GUI object to a position that would select schedule dates that are not possible in accordance with constraints within the associated DVE object. However, if no constraints are violated, then the user would be allowed to input selections or GUI actions that indicate that the user desires to propose a change to a DVE object or DVE project (step 1010). The DVE project, through its own methods, computes the impact of the proposed change upon other DVE objects and possibly upon other DVE projects (step 1012). If other personnel are viewing the DVE project, then those views would capture the proposed change and present any appropriate impacts on those views (step 1014). For example, if a purchasing agent were to propose a change within a DVE project, then a financial manager that is viewing the DVE project would be presented with the financial impacts of the proposed change. After the proposed change is accepted and finalized as noted in FIG. 9, then the other project views would also capture the approved changes within a permanent view of the modified DVE project (step 1016).

It is important to note that while the present invention has been described in the context of a fully functioning data processing system, those of ordinary skill in the art will appreciate that some of the processes associated with the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for processing e-commerce information within a distributed virtual enterprise (DVE) of a business entity, the method comprising:

retrieving a DVE project model that represents a project for a product or service for sale by the business entity, wherein the DVE project model comprises dependency relationships derived from e-commerce agreements such that the dependency relationships constrain modifications of the DVE project model with respect to specific parameters;

receiving user input to manipulate a cost dependency relationship within the DVE project model while constraining the user input to ensure that another type of dependency relationship is not incompatible with modifications to the cost dependency relationship, the cost dependency being represented via a DVE object;

modifying a first e-commerce agreement to change dependency information within the first e-commerce agreement from which the cost dependency relationship was previously derived, the first e-commerce agreement being represented via a DVE object, the information within the DVE object being derived from the first e-commerce agreement, the modifying being performed via a DVE enabling method; and, automatically generating a second e-commerce agreement for a trading partner of the business entity in order to seek the modification to the first e-commerce agreement, the second e-commerce agreement being represented via a DVE object, the information within the DVE object being derived from the second e-commerce agreement, the automatically generating being performed via a DVE enabling method.

2. The method of claim 1 wherein the business entity and the trading partner transfer e-commerce agreements through an electronic marketplace.

* * * * *